April 14, 1964 M. B. FREEDMAN 3,129,421
DATA DISPLAY APPARATUS
Filed July 15, 1959

*INVENTOR.*
MELVIN B. FREEDMAN
BY
*Joseph Weingarten*
ATTORNEY

United States Patent Office 3,129,421
Patented Apr. 14, 1964

3,129,421
DATA DISPLAY APPARATUS
Melvin B. Freedman, Waltham, Mass., assignor, by mesne assignments, to Laboratory for Electronics, Inc., Boston, Mass., a corporation of Delaware
Filed July 15, 1959, Ser. No. 827,344
2 Claims. (Cl. 340—378)

This invention relates in general to electronically controlled data displays and more particularly to a rectilinear readout display.

High speed electronic scalers capable of totalizing and reading out up to 100,000 or 1 million counts are now well known in the art. While a variety of circuits have been used to provide the scaling mechanism, the basic counting unit itself is generally one of two types. The first type is a conventional vacuum tube cascaded flip-flop circuit which in many cases is arranged with feedback to provide a scale of ten, while the second type is the more recently developed glow transfer tube. In the glow transfer tube ten cathode elements are arranged in a circle about a single anode, each cathode having interspersed grid elements. The circuitry is arranged such that a neon glow discharge occurs between the anode and one cathode. If a pulse is applied in proper sequence to the grid of the tube the glow discharge is transferred to the next adjacent cathode and hence the location of the glow discharge is an indication of the number of pulses applied to the tube. The general practice for reading out a scaler employing the glow transfer tube is to allow the end of the tubes to protrude through the front panel and to engrave on the front panel numbers in positions corresponding to the radial position of the glow to the cathode when that number of pulses has been entered into the decade. Since the cathodes are arranged in a circle, the readout for each decade is essentially rotary and when the scaler is stopped the total number of counts accumulated is read out by noting the position of the glow and reading the corresponding number for each decade. Thus to perform this readout, the viewer must ascertain where the glow is and what is the corresponding number for each decade of the scaler. Such a system is uncertain, subject to parallax, and very tedious to read. If six decades are employed another problem arises from the relatively large diameter of commercially available glow transfer tubes. If, using these tubes, a reasonable space is left on the diameter for engraving the numbers, a six decade readout may actually be twelve inches wide. Further, apart from the readout problem itself, the decade tubes in such a system must be in line and hence there must be at least an equivalent space across the front panel for the decade tubes alone, which places a severe limitation on panel design and tube layout.

In the vacuum tube flip-flop decade, scale readout is generally accomplished by means of neon lamps mounted in a vertical column on each decade assembly. Thus each scale of ten can constitute a plug-in unit and a rectilinear readout is provided. Here again a problem of spacing across the front panel is present since, in practice, such plug-in strips result in a physical display wherein a six decade unit may occupy a width of ten inches. This system also presents a non-integrated readout since each decade must be separately mounted.

Neither system then is entirely satisfactory since with the glow transfer tube the readout is rotary and subject to misinterpretation and a severe space limitation is present. With the conventional vacuum tube flip-flop there are severe space limitations and the readout display is not an integrated unit.

It is therefore a primary object of the present invention to provide an accurate, economical, compact, rectilinear read-out for glow transfer scaling circuits.

It is another object of the present invention to provide a compact, accurate, easily readable readout system for decade scalers.

It is still another object of the present invention to provide a single, compact, accurate readout panel which lends itself to efficient and economical mass production.

Broadly speaking, the present invention provides an integrated, easily manufactured, flat readout panel as a digital display. All the neon lamps are mounted on a printed circuit board, which provides contact points for electrical connections to the counting circuits which may now be located anywhere within the instrument. Since the neon lamps themselves are in the order of ¼" diameter and perhaps one-half inch in length, it would be feasible to provide a six decade readout in less than two inches. The panel is constructed with a grating mounted on the circuit board which serves to isolate each individual neon lamp and provide high readout resolution, even in such a compact panel. An optical diffuser and filter further provides excellent visual clarity of the numerical indicia.

The fabrication and assembly of the display is very economical since mass production techniques, such as dip soldering and the like, can be applied.

These and other objects and advantages will become apparent from the following detailed description when taken in conjunction with the accompanying drawing in which.

Figure 1:
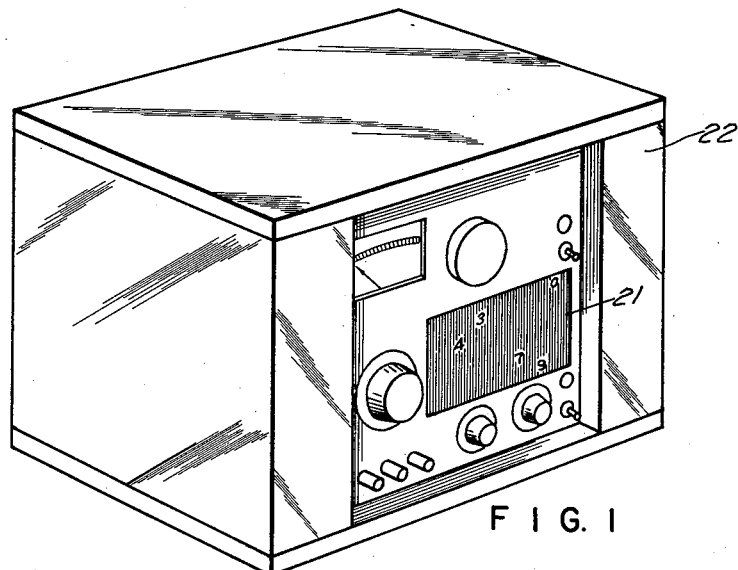
FIG. 1 is a perspective view of a typical scaler instrument employing the readout system of this invention.

With reference now specifically to FIG. 1, the readout panel 21 of this invention is shown mounted on the front face of a conventional electronic scaler 22. It will be noted that in each digit column only that digit which is indicated appears, and hence no process of selection of which digit is illuminated is required; rather it is immediately obvious what the digit is.

Figure 2:
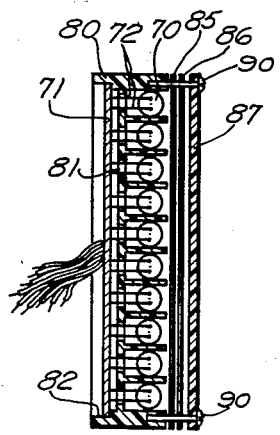
FIG. 2 is a cross-sectional view taken along the line A—A of FIG. 3 of the readout panel of this invention.
Figure 3:
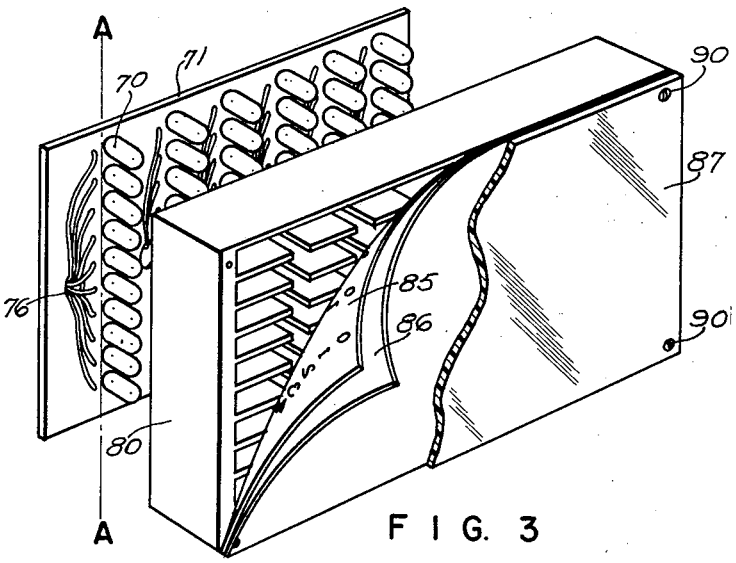
FIG. 3 is an exploded view with a partial breakaway of the readout panel of this invention.
Figure 4:
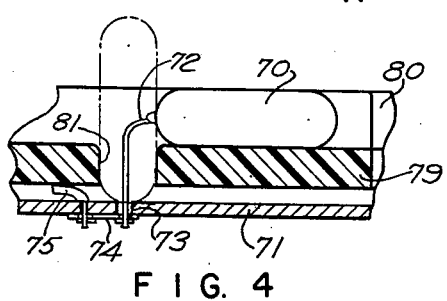
FIG. 4 is a cross-sectional view of a detail of the panel taken along the line B—B of FIG. 3.

Referring now to FIGS. 2, 3, and 4, the novel readout panel is shown in both cross-sectional and perspective views. Upstanding neon lamps 70, such as the Ne–2E type, are initially mounted in a two-dimensional array on the front face of printed circuit board 71, as shown in FIG. 2. Each column of neon lamps then represents one decade of the counting system. The two leads 72 of each neon lamp are passed through a pair of holes 73 (one of which is shown in FIG. 3) in the printed circuit board and one lead is soldered, preferably dip soldered, to conducting strip 74 to which is also soldered wire 75. Wire 75 runs back through a second hole in the printed circuit board 71 and is then insulated and carried over to hole 76 along with the wires from each of the other neon lamps. The second wire is brought through the second hole 73 (not shown) and soldered to a suitable ground lead (not shown). Each neon lamp has then a ground lead and an insulated wire 75 connected to its terminals. A clearance hole 76 for the ten insulated leads is provided for each decade.

A grating 80, preferably formed of an insulating material, which is open on its front face and has on its rear face 79 a two-dimensional array of clearance holes for passing the neon lamps into the grate, is placed directly over the circuit board 71 into the position as indicated in FIGS. 2 and 4. The grating is divided into a rectilinear two-dimensional array of compartments, each column thereof having ten compartments, and the total number of columns in the grating being the same as the total numbers of columns of neon lamps. The grating is preferably formed of an insulating material in order to minimize the possibility of short circuits between the neon lamp leads 72 and the sides of the holes 81. The internal surfaces of the compartments and the front face of board 71 are preferably reflecting in order to provide maximum light directed to the front face of the compartment. This may be accomplished either by applying a suitable reflecting coating such as silver paint, or by forming the grating or board out of a reflecting material such as white plastic. In assembling the printed circuit board 71 with the neon lamps 70 mounted thereon and the grating 80, the neon lamps are placed with their longitudinal axes vertical to the circuit board and the grating is then lowered over them. Each of the lamps 70 thus is disposed in an individual compartment; thereafter each of these lamps is laid flat in the compartment as illustrated in FIGS. 2 and 4.

By laying the neon lamps flat, maximum illumination is provided, since the electrode structure is such that more surface of the electrodes is exposed to the open face of the compartment in the flat position, than if it were left standing up. The grating construction then requires an opening on the back face sufficient to allow the lamp to enter vertically (which is the short dimension) but by folding over the lamp, its long dimension is exposed.

If it is desired to obtain closer spacings of the readout, a grating may be utilized with the neon lamps remaining vertical and the light coming from the end of the lamp. This will permit a lesser spacing between columns of lamps.

The back of the grating 80 is formed with a stopped recess 82 such that the printed circuit board fits within the recess, while being spaced a small distance from the bottom surface of the grating, allowing clearance for the insulated leads 75 to pass from each neon to the clearance holes 76, at which point they may be grouped into cables to connect to the counting circuits. When the printed circuit board is assembled, the neon lamps and the insulated leads may be inserted without initially feeding the insulated leads 75 through the clearance holes. Thus the entire bottom of the board may be dip soldered and after this step has taken place the insulated leads can be fed through clearance holes 76.

The numerical indication for the neon lamps is provided by a screen 85, formed of opaque material, with transparent numerals located over the appropriate compartments. One means of forming this screen is to use a photographic film containing transparent numerals on a black background. A diffusing screen 86 is placed directly over the indicating screen with the diffused surface adjacent to the indicating screen 85. This screen diffuses the light from the neon lamps such that the entire numeral is displayed evenly without being localized to the electrode area of the lamp. A suitable material which has been employed for this diffusing screen is frosted Mylar sheet.

The front window of the readout panel is a plastic filter plate 87, such as Plexiglas, tinted neutral grey. This plate not only serves to present a contrasting dark surface for the display of the lighted numerals, but, by virtue of having a transmission characteristic in the order of 50%, absorbs twice as much reflected light as the transmitted light from the lamps, hence improving the contrast of the numerals. The entire package is secured with bolts 90 at each corner.

When none of the neon lamps is illuminated, the effect is of a dark blank panel, since the unlighted numerals are not visible through the filter plate and the diffusing screen. When, however, a numeral is lighted, it and it alone, appears on the filter plate since the compartmentalization of the neon lamps prevents the light from one neon lamp shining through another numeral.

While the panel here has been described in terms of a particular construction of the components, it should be realized that many alternatives are possible. For example, the grating 80, in the above embodiment, has horizontal dividers, only, the spacing of the neon lamps being sufficient to prevent cross illumination; however, vertical dividers might also be used to provide more complete isolation. This grating may also be formed of a solid plastic block with cylindrical holes drilled or cast partly or entirely through it. The filter plate may be formed of a particular wavelength filter material, such as a red filter, to accentuate the predominantly red light from the neon lamp and improve the contrast to the white light incident on the filter plate surface. Again, the diffusing screen 87 may also be tinted red in order to improve the contrast. Still another possibility is the use of a polarized plate in place of filter plate 87, improving the contrast between the transmitted light from the neon bulbs and the reflected light incident on the surface.

From the foregoing it is obvious that many modifications and improvements may now be made by those skilled in the art; the invention disclosed herein should be construed as limited only by the spirit and scope of the appended claims.

What is claimed is:

1. A rectilinear readout display comprising, a plurality of neon lamps mounted on a printed circuit board, a grating disposed in front of said board over said neon lamp array, said grating being formed with a plurality of compartments, said compartments being open on the front face of said grating and being formed with openings on the back face thereof such that said neon lamps can be inserted therein, the inner surfaces of said compartments and the front face of said printed circuit board being formed of optical reflecting material, whereby the illumination from said neon lamps is increased at said opening in said front face of said grating, a screen superposed on said front face of said grating, said screen containing identifying characters disposed such that an individual character is illuminated for each of said neon lamps which is illuminated.

2. A rectilinear readout display comprising, a plurality of neon lamps mounted on a printed circuit board, a grating disposed in front of said board over said neon lamp array, said grating being formed with a plurality of compartments, said compartments being open on the front face of said grating and being formed with openings on the back face thereof, said openings on the back face being sufficiently large so that said neon lamps can be inserted therein in an upstanding position, said neon lamps thereafter being disposed in a horizontal position whereby maximum illumination is provided at the front face of said compartments, the inner surfaces of said compartments and the front face of said printed circuit board being formed of optical reflecting material, whereby the illumination from said neon lamps is increased at the said front face of said grating.

References Cited in the file of this patent

UNITED STATES PATENTS

| | | |
|---|---|---|
| 2,043,308 | Simpson | June 9, 1936 |
| 2,985,794 | Sarratt | May 23, 1961 |